United States Patent [19]

Roby et al.

[11] 4,077,644
[45] Mar. 7, 1978

[54] PLATFORM HAND TRUCK

[75] Inventors: Michael A. Roby; Glen E. Tomblin, both of Winchester, Va.

[73] Assignee: Rubbermaid Commercial Products Inc., Winchester, Va.

[21] Appl. No.: 731,368

[22] Filed: Oct. 12, 1976

[51] Int. Cl.² .............................................. B62B 3/02
[52] U.S. Cl. ........................... 280/47.34; 280/79.1 R; D12/25
[58] Field of Search .......... 280/47.34, 79.1 R, 79.1 A, 280/47.37, 47.35, 47.36; D12/25; 108/51.1; 16/29

[56] References Cited

U.S. PATENT DOCUMENTS

| D. 219,649 | 1/1971 | Salcman ................................ D12/25 |
| 1,715,403 | 6/1929 | Young .............................. 108/51.1 X |
| 1,785,064 | 12/1930 | Zeindler ........................... 280/79.1 R |
| 2,414,277 | 1/1947 | Shepard, Jr. et al. ............. 280/47.34 |
| 2,800,679 | 1/1957 | Schultz, Jr. ................................ 16/29 |
| 3,137,250 | 6/1964 | Hutchinson ................... 280/47.34 X |
| 3,241,850 | 3/1966 | Propst ........................... 280/47.34 X |

Primary Examiner—Joseph F. Peters, Jr.
Assistant Examiner—Michael J. Forman
Attorney, Agent, or Firm—Hamilton, Renner & Kenner

[57] ABSTRACT

A platform hand truck having an integrally formed rectangular platform preferably of synthetic resin with a planer top deck and a depending rim flange. The deck is reinforced on its underside with a patterned rib structure provided with a plurality of recesses for receiving caster-mounting adapter blocks of synthetic resin in selective arrangements. The adaptor blocks are designed to embrace reinforcing angles supporting caster plates carrying the platform. A removable cover of plastic material is preferably provided for enclosing the platform.

14 Claims, 7 Drawing Figures

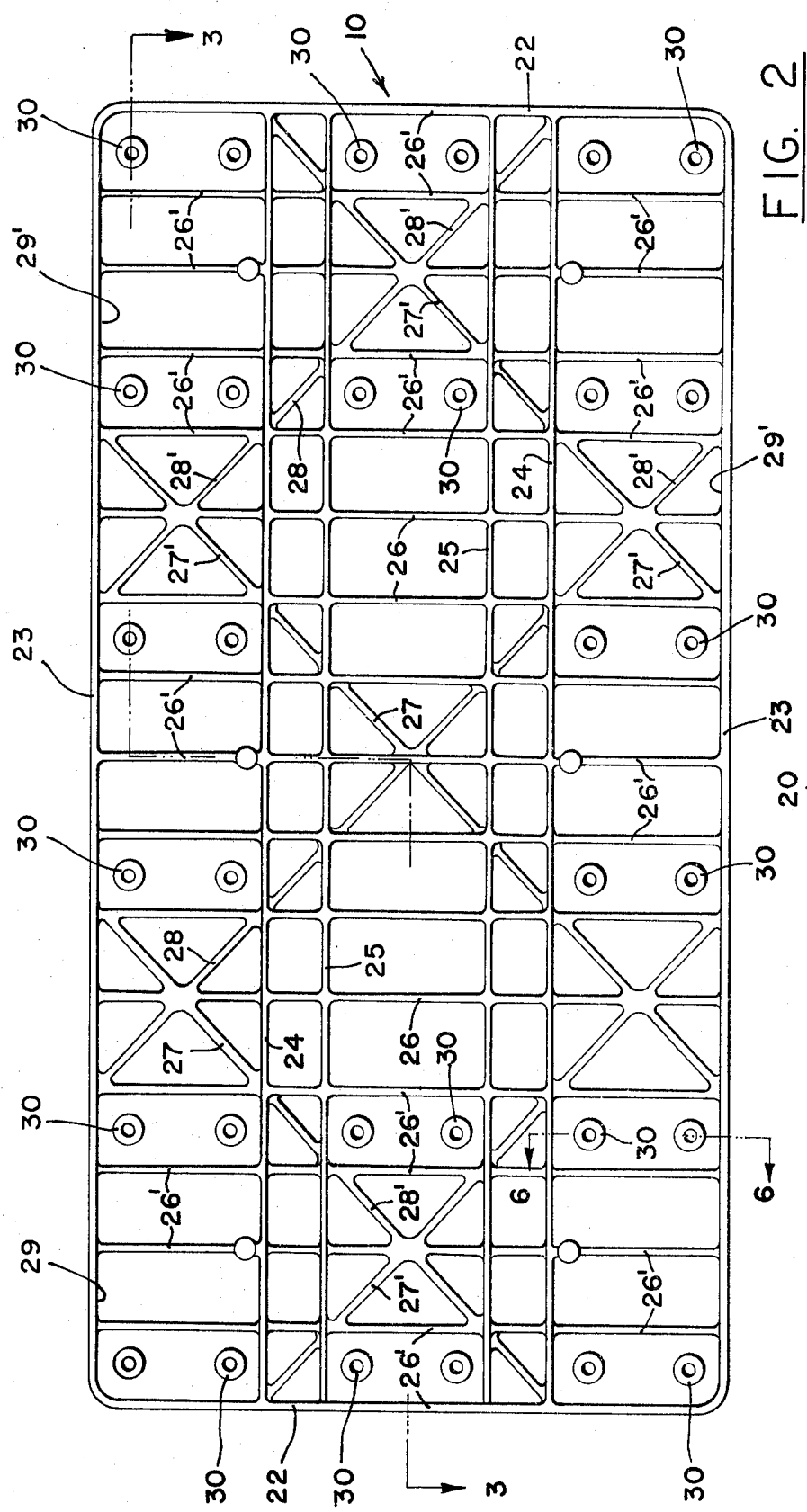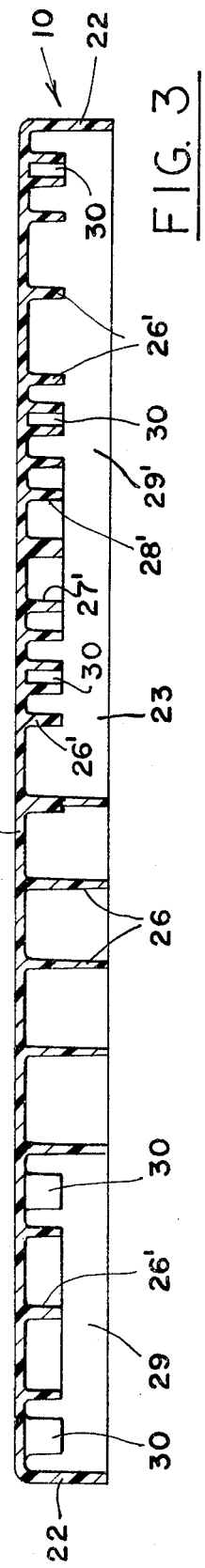

PLATFORM HAND TRUCK

BACKGROUND OF THE INVENTION

Conventional platform hand trucks are made of a variety of materials including wood and various metals. All of these materials have their drawbacks, particularly when used in food processing and related areas. Wood absorbs moisture and unsanitary fluids, and is subject to splintering which requires costly repair or replacement. Metal is subject to denting, scratching and corrosion, and both wood and metal require costly protective coatings and increased maintenance operations to keep them sanitary. Moreover, most wood and metal trucks are heavy and have high initial fabrication costs.

SUMMARY OF THE INVENTION

The present improved platform truck is light in weight, non-absorbent and sanitary, and does not require protective coatings to maintain it sanitary.

It is an object of the invention to provide an integrally formed platform truck adapted for use in food processing and having low maintenance cost.

Another object is to provide an improved integrally formed truck platform having a reinforcing rib pattern on its underside with a plurality of recesses therein for receiving caster-mounting adaptor blocks in selective arrangements.

A further object is to provide improved integrally formed adaptor blocks designed to mount caster plates and to embrace reinforcing angles supporting said plates.

Another object is to provide a protective removable cover of plastic material for enclosing the platform and adaptor blocks received therein.

These and other objects are attained by the improved parts, structures and combinations comprising the present invention, a preferred embodiment of which is shown by way of example in the accompanying drawings and described in detail in the following specification. The appended claims include certain modifications and changes in details of construction.

BRIEF DESCRIPTION OF THE DRAWINGS

FIG. 2 is a bottom plan view of the platform.

FIG. 3 is a sectional view on line 3—3 of FIG. 2.

DESCRIPTION OF A PREFERRED EMBODIMENT

Figure 1:
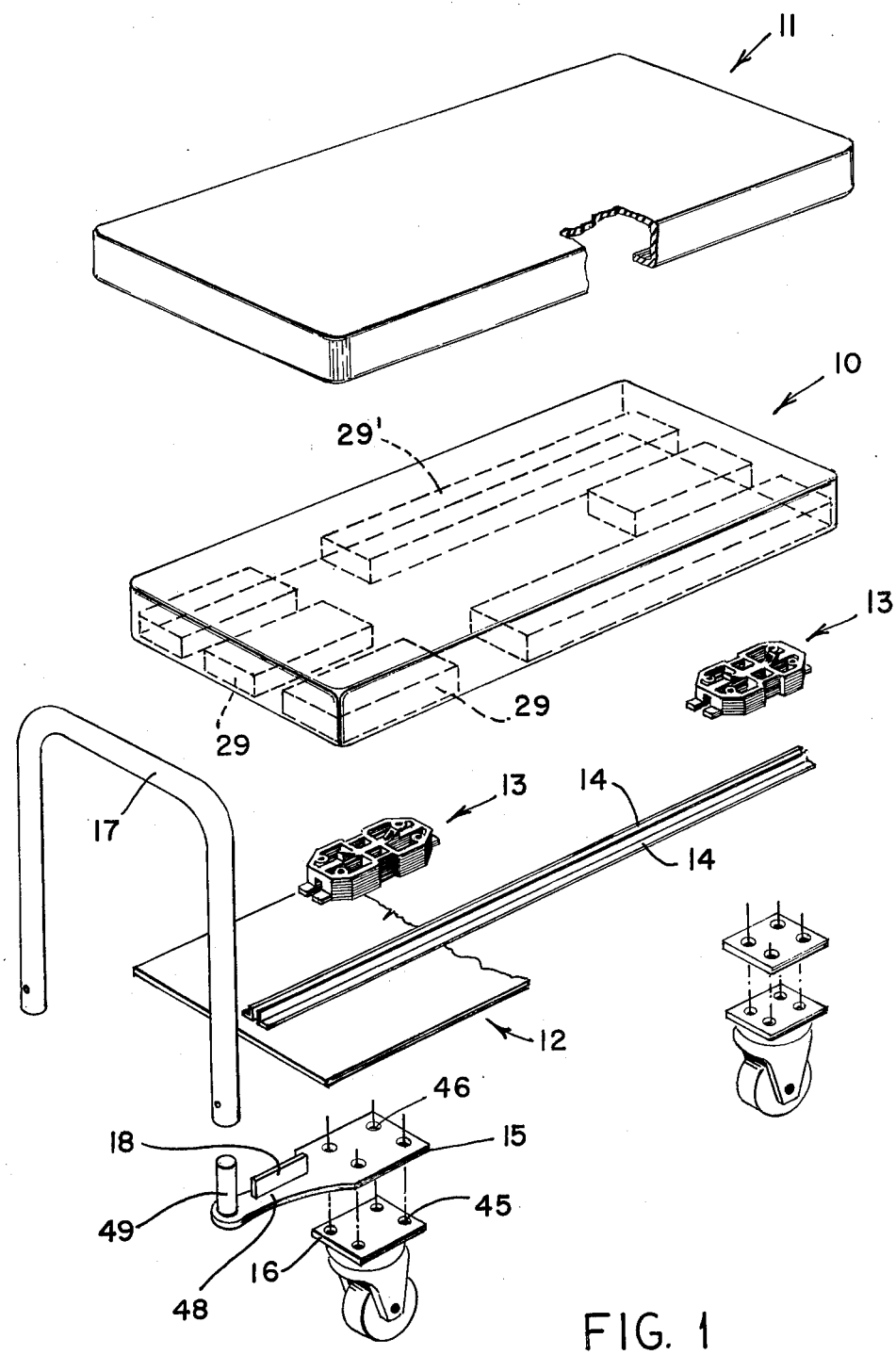
FIG. 1 is an exploded perspective view (partly broken away) of the improved platform hand truck and removable cover, the reinforcing angles being partially shown only on one side and with two of the adaptor blocks and supporting casters.

Referring to FIG. 1, the improved platform is indicated generally at 10, and the cover therefor comprises a top cover or shroud indicated generally at 11 and a bottom cover plate 12. The adaptor blocks for fitting in bottom recesses in one side of the platform are indicated generally at 13, with two reinforcing angles shown fragmentarily at 14 for supporting one or more aligned blocks 13. At the rear end of the platform the angles 14 rest on the handle bracket plates 15 carried by caster mounting plates 16. The handle is shown at 17, and a web plate 18 for fitting between the angles 14 is preferably welded edgewise on top of plate 15.

Referring to FIGS. 2 and 3, the platform 10 is preferably integrally molded of plastic material, such as foamed polyethylene, and has a top deck 20 with a planar top surface, and a depending rim flange extending continuously around the deck and having end portions 22 and side portions 23.

The platform has a reinforcing rib pattern on its underside comprising outer longitudinal ribs 24, inner longitudinal ribs 25, transverse ribs 26 and crossed reversely inclined ribs 27 and 28. These ribs are equal in depth to the rim flanges 22 and 23, except where rectangular recesses 29 and 29' are formed by shortening the ribs 26, 27 and 28 to about one-half depth, as indicated at 26', 27' and 28', respectively.

Figure 7:
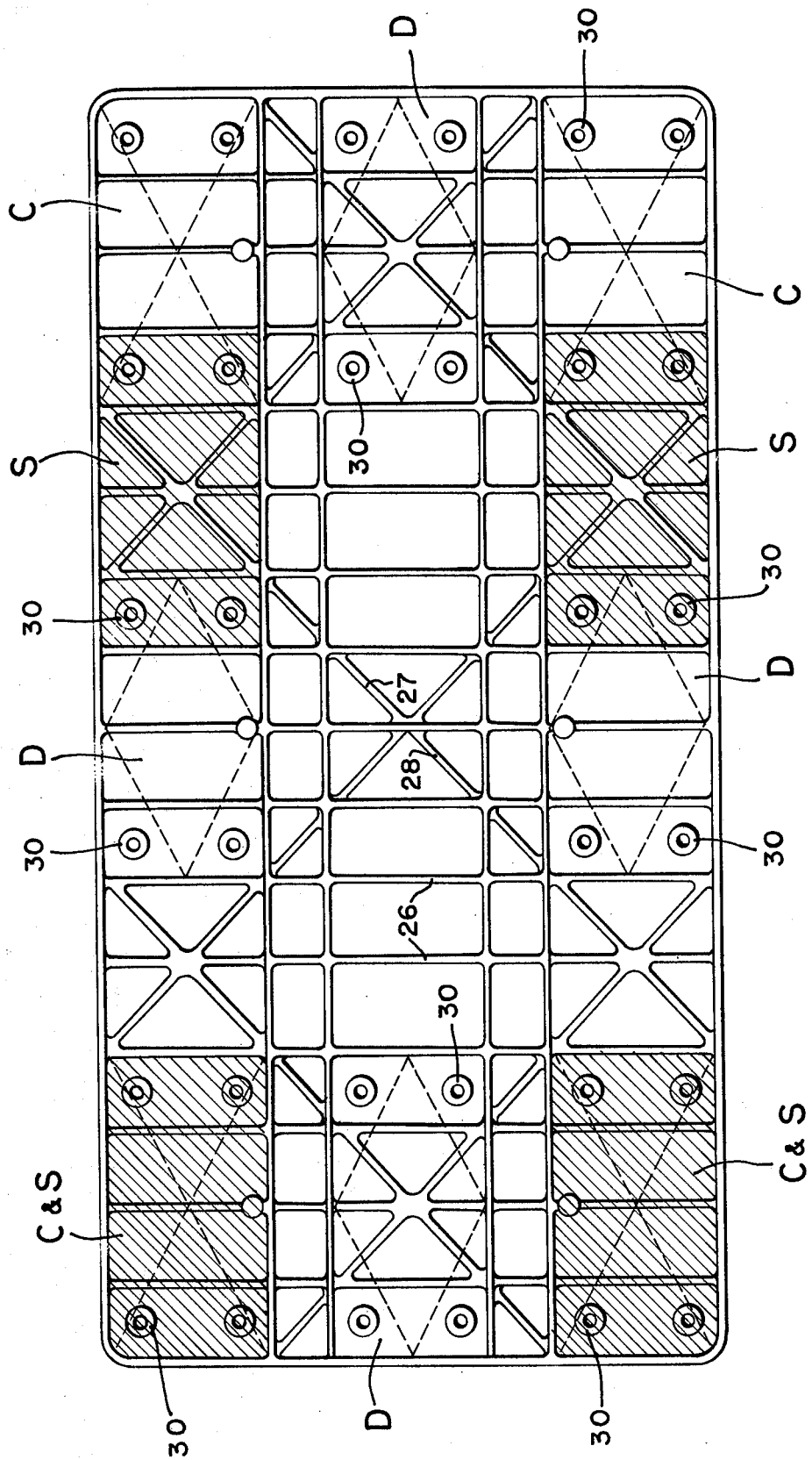
FIG. 7 is a view similar to FIG. 2 showing, schematically, selected arrangements of the adaptor blocks in the platform.

These recesses are arranged to receive adaptor blocks 13 in three different arrangements of four blocks each to conform to three caster arrangements in conventional use. There are ten adaptor block locations and they are indicated in FIG. 7 wherein the recess areas D represented by diamond outlines are located in a diamond arrangement, the recess areas C represented by crossed diagonal lines are at the four corners of the platform, and the hatched recess areas S are in what is known as the standard industry pattern in which the rear corner recess areas C are used and the other two recess areas S overlap both the front corner recess areas C and the central recess areas D. Thus, the front corner recess areas C and the adjoining S and D recess areas form two continuous longitudinal recesses. In each of the ten block locations four tubular depending projections 30 are provided in the corners of the recess rectangles for securing the adaptor blocks 13 in the selected arrangements. The projections 30 are preferably the same depth as the ribs 26', 27' and 28'.

Figure 4:
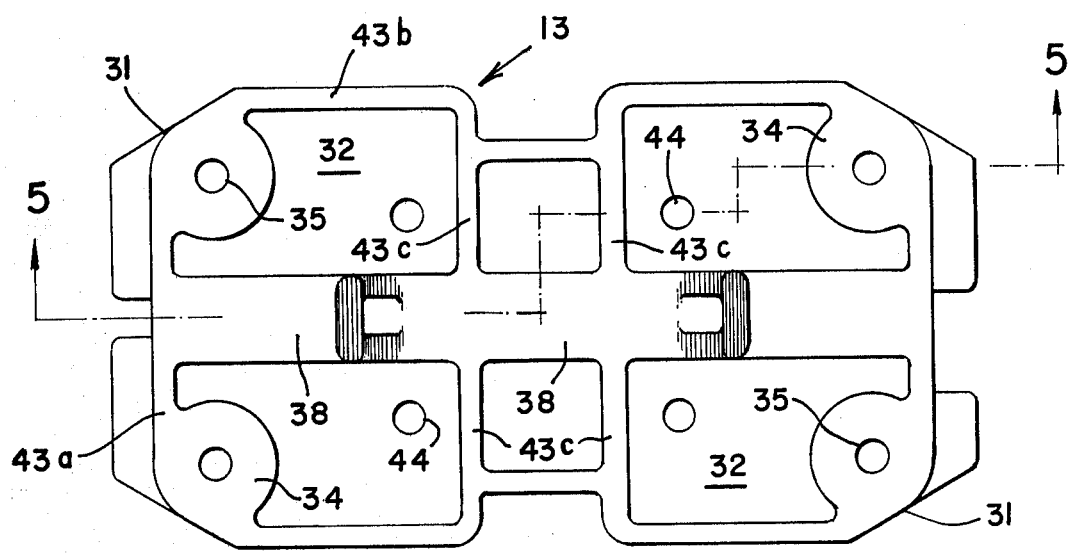
FIG. 4 is an enlarged top plan view of one of the improved adaptor blocks.
Figure 5:
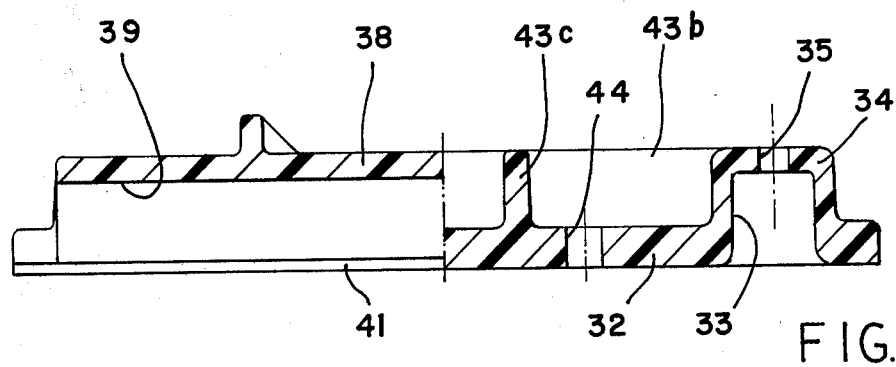
FIG. 5 is a sectional view on line 5—5 of FIG. 4.
Figure 6:
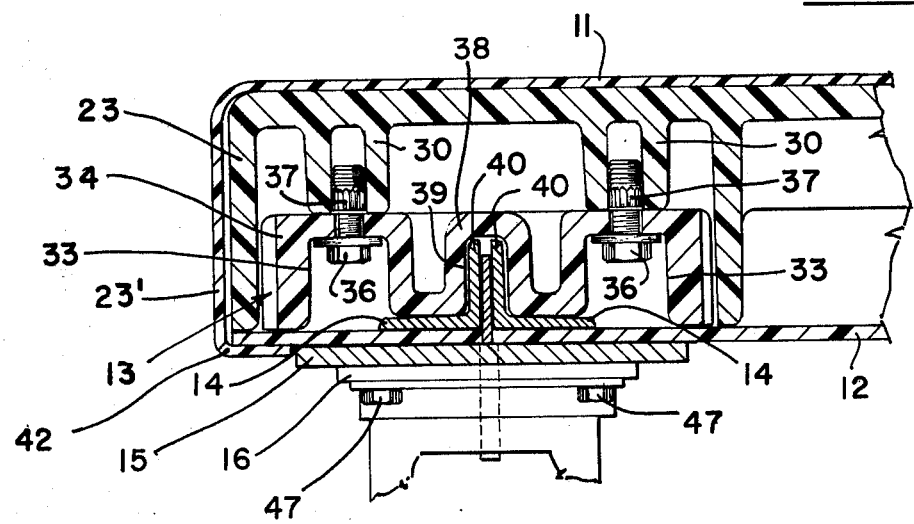
FIG. 6 is an enlarged sectional view as on line 6—6 of FIG. 2, showing an adaptor block secured in a recess of the platform and the top cover and bottom cover plate enclosing the platform.

Referring to FIGS. 4 - 6, the adaptor blocks 13 are substantially rectangular with beveled corners shown at 31 and adapted for fitting in the recesses in the platform. Each block is preferably molded of plastic material such as foamed polyethylene and has a bottom wall 32 with four upwardly disposed cylindrical sockets 33 at the corners. The upper walls 34 of the sockets have bolt holes 35 therein for registering with the tubular projections 30 of the platform recesses, and, as shown in FIG. 6, bolts 36 inserted in the sockets have expansion sleeves 37 thereon within the projections 30 for securing the adaptor block to the platform.

A medial rib 38 runs longitudinally through the block 13 with its top surface flush with the tops of socket walls 34, and a longitudinal groove 39 is formed under the rib 38 for receiving the vertical legs 40 of the two reinforcing angles 14 in back-toback relation. A shallow longitudinal recess 41 in the bottom wall 32 adjoining the groove 39 receives the horizontal legs of angles 14 so that their bottom surfaces are flush with the bottom surface of wall 32. The angles extend longitudinally from the rear corner recesses in the platform through additional longitudinally aligned recesses therein.

As shown in FIG. 6, the bottom cover plate 12 is adapted to abut the bottom of the rim flange portions 22 and 23 of the platform and the bottom surfaces of the adaptor blocks 13 secured in the platform recesses. The top cover or shroud 11 has a depending rim flange 23' for enclosing the platfrom rim flange 23, and flange 23' terminates in an inturned lip flange 42 which engages under the marginal edge portion of cover plate 12. The cover plate 12 and shroud 11 are made of thin flexible plastic material so that the lip flange 42 is easily flexed to allow applying it over the platform and engaging it under the edge of plate 12.

Obviously, the improved platform 10 may be used with or without the cover plate and shroud. As shown in FIG. 6, when the cover plate and shroud are used, the cover plate 12 is interposed between the bottoms of the rear corner adaptor blocks and the caster plates 16 supporting the blocks. Since one of the rear corners of the platform is shown in FIG. 6, a bracket plate 15 for the handle is shown interposed between the caster plate 16 and the cover plate 12.

As shown in FIGS. 4 and 5, upstanding rim flanges 43a and 43b connect the socket walls of each block and transverse ribs 43c connect the flanges 43b to medial rib 38. The bottom wall 32 has four bolt holes 44 therein which are adapted to register with the holes 45 in the caster plates 16 and the holes 46 in the handle bracket plates 15 (FIG. 1). Bolts 47 inserted through the registering holes secure the plates 15 and 16 to the adaptor block.

The handle bracket plates have rearwardly extending tongues 48 with upright studs 49 on their rear ends adapted to fit into the ends of the tubular handle 17 secured thereto by set screws or the like. Preferably, the tongues 48 have upstanding stabilizing webs 18 secured thereon for engaging between the vertical legs 40 of the reinforcing angles, as seen in FIG. 6.

It will be apparent that the improved platform truck is lightweight, non-absorbent and sanitary, and is well adapted for use in food processing with low maintenance cost. The novel molded adaptor blocks in cooperation with the recesses in the platform provide for selective caster arrangements to meet industry requirements. A novel cover of plastic material is provided for fully enclosing the platform.

We claim:

1. A platform hand truck having a rectangular integrally formed platform provided with a deck having a planar top surface and a depending rim flange and a patterned reinforcing rib structure on its underside, said rib structure having a plurality of recesses therein, a plurality of adaptor blocks of lesser number than the recesses, means for detachably securing said blocks in said recesses in various selective arrangements, caster bracket plates having wheels, said blocks adapted to be secured to said caster bracket plates for supporting said platform, and longitudinal supporting bars embraced by said blocks and adapted for resting on said bracket plates.

2. A platform hand truck as defined in claim 1, wherein said platform and said adaptor blocks are integrally formed of synthetic resin.

3. A platform hand truck as defined in claim 2, wherein a removable cover of plastic material is provided for enclosing said platform.

4. A platform hand truck as defined in claim 3, wherein the removable cover comprises a bottom plate coextensive with said platform and extending under all of said blocks, and a top cover plate having a depending rim flange surrounding said platform and terminating at the margin of said bottom plate.

5. A platform hand truck as defined in claim 2, wherein a handle bracket plate is provided adapted for being mounted between at least one of said blocks and one of said caster bracket plates and has a lateral extension, and a handle is detachably secured to said handle bracket plate extension.

6. A platform hand truck as defined in claim 2, wherein the longitudinal supporting bars are angles having vertical legs in back-to-back relation, and at least two of said blocks have longitudinally aligned bottom grooves receiving said vertical legs.

7. A platform hand truck as defined in claim 2, wherein said blocks have downwardly open sockets therein, and bolts in said sockets secure said blocks to said deck in said recesses.

8. A platform hand truck as defined in claim 7, wherein tubular projections on the underside of said platform receive said bolts, and expansion means is provided to secure said bolts in said tubular projections.

9. A platform hand truck as defined in claim 1, wherein a removable cover of plastic material is provided for enclosing said platform.

10. A platform hand truck as defined in claim 9, wherein the removable cover comprises a bottom plate coestensive with said platform and extending under all of said blocks, and a top cover plate having a depending rim flange surrounding said platform and terminating at the margin of said bottom plate.

11. A platform hand truck as defined in claim 1, wherein a handle bracket plate is provided adapted for being mounted between at least one of said blocks and one of said caster bracket plates and has a lateral extension, and a handle is detachably secured to said handle bracket plate extension.

12. A platform hand truck as defined in claim 1, wherein the longitudinal supporting bars are angles having vertical legs in back-to-back relation, and at least two of said blocks have longitudinally aligned bottom grooves receiving said vertical legs.

13. A platform hand truck as defined in claim 1, wherein said blocks have downwardly open sockets therein, and bolts in said sockets secure said blocks to said deck in said recesses.

14. A platform hand truck as defined in claim 13, wherein tubular projections on the underside of said platform receive said bolts, and expansion means is provided to secure said bolts in said tubular projections.

* * * * *